US011270121B2

(12) United States Patent (10) Patent No.: US 11,270,121 B2
Nir et al. (45) Date of Patent: Mar. 8, 2022

(54) SEMI SUPERVISED ANIMATED CHARACTER RECOGNITION IN VIDEO

(71) Applicant: Microsoft Technology Licensing, LLC, Redmond, WA (US)

(72) Inventors: Oron Nir, Hertzeliya (IL); Maria Zontak, Seattle, WA (US); Tucker Cunningham Burns, Issaquah, WA (US); Apar Singhal, Seattle, WA (US); Lei Zhang, Bellevue, WA (US); Irit Ofer, Kfar-Saba (IL); Avner Levi, Kiryat Ono (IL); Haim Sabo, Petah Tikva (IL); Ika Bar-Menachem, Herzliya (IL); Eylon Ami, Givataayim (IL); Ella Ben Tov, Tel-Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 39 days.

(21) Appl. No.: 16/831,353

(22) Filed: Mar. 26, 2020

(65) Prior Publication Data

US 2021/0056313 A1 Feb. 25, 2021

Related U.S. Application Data

(60) Provisional application No. 62/889,319, filed on Aug. 20, 2019.

(51) Int. Cl.
*G06K 9/00* (2006.01)
*G06K 9/62* (2022.01)

(52) U.S. Cl.
CPC ..... *G06K 9/00718* (2013.01); *G06K 9/00744* (2013.01); *G06K 9/626* (2013.01); *G06K 9/6256* (2013.01)

(58) Field of Classification Search
None
See application file for complete search history.

(56) References Cited

U.S. PATENT DOCUMENTS 7,016,540 B1 3/2006 Gong et al.
7,460,730 B2 12/2008 Pal et al.
(Continued)

FOREIGN PATENT DOCUMENTS

CN 101976258 A 2/2011
CN 108564598 A 9/2018
(Continued)

OTHER PUBLICATIONS

Krishna Somandepalli et al. "Unsupervised Discovery of Character Dictionaries in Animation Movies" IEEE Mar. 2018. (Year: 2018).*
(Continued)

*Primary Examiner* — Leon Flores

(57) ABSTRACT

The technology described herein is directed to a media indexer framework including a character recognition engine that automatically detects and groups instances (or occurrences) of characters in a multi-frame animated media file. More specifically, the character recognition engine automatically detects and groups the instances (or occurrences) of the characters in the multi-frame animated media file such that each group contains images associated with a single character. The character groups are then labeled and used to train an image classification model. Once trained, the image classification model can be applied to subsequent multi-frame animated media files to automatically classifying the animated characters included therein.

20 Claims, 12 Drawing Sheets

(56) References Cited

U.S. PATENT DOCUMENTS

| | | | |
|---|---|---|---|
| 7,920,761 | B2 | 4/2011 | Amir et al. |
| 8,111,284 | B1 | 2/2012 | Givon |
| 8,170,280 | B2 | 5/2012 | Zhao et al. |
| 8,311,344 | B2 | 11/2012 | Dunlop et al. |
| 8,805,110 | B2 | 8/2014 | Rodriguez et al. |
| 9,094,615 | B2 | 7/2015 | Aman et al. |
| 9,357,242 | B2 | 5/2016 | Sinha et al. |
| 9,542,751 | B2 | 1/2017 | Mannino et al. |
| 9,754,177 | B2 | 9/2017 | Liu et al. |
| 10,204,274 | B2 | 2/2019 | Smith et al. |
| 10,213,645 | B1 | 2/2019 | Wu et al. |
| 10,522,186 | B2 | 12/2019 | Attorre et al. |
| 10,958,874 | B2 | 3/2021 | Astarabadi et al. |
| 2005/0196043 | A1 | 9/2005 | Jung et al. |
| 2009/0141940 | A1 | 6/2009 | Zhao et al. |
| 2012/0026174 | A1 | 2/2012 | Mckeon et al. |
| 2013/0300939 | A1 | 11/2013 | Chou et al. |
| 2018/0268255 | A1 | 9/2018 | Surazhsky et al. |
| 2019/0073564 | A1 | 3/2019 | Saliou |
| 2019/0236371 | A1 | 8/2019 | Boonmee et al. |
| 2019/0370551 | A1 | 12/2019 | Mao et al. |
| 2021/0056362 | A1 | 2/2021 | Nir et al. |

FOREIGN PATENT DOCUMENTS

| | | |
|---|---|---|
| CN | 110096929 A | 8/2019 |
| WO | 2017124221 A1 | 7/2017 |

OTHER PUBLICATIONS

"Object Detection for Self-Driving Cars", Retrieved From: https://www.hackerearth.com/blog/developers/object-detection-for-self-driving-cars/, Sep. 24, 2018, 24 Pages.

"Unlock Video Insights", Retrieved From: https://vi.microsoft.com/en-us/, Retrieved Date: Aug. 7, 2019, 7 Pages.

"Visual Intelligence Made Easy", Retrieved From: https://www.customvision.ai/, Aug. 7, 2019, 2 Pages.

Forczmanski, et al., "Two-stage Approach to Extracting Visual Objects from Paper Documents", In Journal of Machine Vision and Applications, Aug. 24, 2016, pp. 1243-1257.

Grzeszick, Rene, "Partially Supervised Learning of Models for Visual Scene and Object Recognition", In Thesis of Technical University of Dortmund, 2018, 161 Pages.

Liu, et al., "Combined Key-Frame Extraction and Object-Based Video Segmentation", In Journal of IEEE Transactions on Circuits and Systems for Video Technology, vol. 15, Issue 7, Jul. 2005, pp. 869-884.

Maiya, Shishira R.., "DeepSORT: Deep Learning to Track Custom Objects in a Video", Retrieved from: https://web.archive.org/web/20190723141631/https:/nanonets.com/blog/object-tracking-deepsort/, Jul. 23, 2019, 22 Pages.

Misra, et al., "Watch and Learn: Semi-Supervised Learning of Object Detectors from Videos", In Proceedings of the IEEE Conference on Computer Vision and Pattern Recognition, Jun. 7, 2015, pp. 3593-3602.

Papadopoulos, et al., "We Don't Need No Bounding-Boxes: Training Object Class Detectors Using Only Human Verification", In Proceedings of the IEEE Conference on Computer Vision And Pattern Recognition, Jun. 27, 2016, pp. 1-10.

Redmon, et al., "You Only Look Once: Unified, Real-Time Object Detection", In Journal of Computing Research Repository, Jun. 11, 2015, pp. 1-9.

Roth, et al., "How to Improve your Classifier", Retrieved From: https://docs.microsoft.com/en-us/azure/cognitive-services/custom-vision-service/getting-started-improving-your-classifier, Mar. 21, 2019, 8 Pages.

Tang, et al., "Large Scale Semi-supervised Object Detection using Visual and Semantic Knowledge Transfer", In Proceedings of the Computer Vision and Pattern Recognition, Jun. 27, 2016, pp. 2119-2128.

Tapu, et al., "DEEP-SEE: Joint Object Detection, Tracking and Recognition with Application to Visually Impaired Navigational Assistance", In Journal of Sensors, vol. 17, Issue 11, Oct. 28, 2017, 24 Pages.

Weng, Lilian, "Object Detection Part 4: Fast Detection Models", Retrieved From: https://lilianweng.github.io/lil-log/2018/12/27/object-detection-part-4.html, Dec. 27, 2018, 19 Pages.

"Non Final Office Action Issued in U.S. Appl. No. 16/831,105", dated Jun. 18, 2021, 14 Pages.

"International Search Report and Written Opinion Issued in PCT Application No. PCT/US20/038004", dated Sep. 29, 2020, 11 Pages.

"International Search Report and Written Opinion Issued in PCT Application No. PCT/US2020/037695", dated Nov. 2, 2020, 14 Pages.

Yu, et al., "On Combining Multiple Features for Cartoon Character Retrieval and Clip Synthesis", In Journal of IEEE Transactions on Systems, Man, and Cybernetics, Part B (Cybernetics), vol. 42, Issue 5, Oct. 2012, pp. 1413-1427.

"Final Office Action Issued in U.S. Appl. No. 16/831,105", dated Dec. 3, 2021, 13 Pages.

\* cited by examiner

SEMI SUPERVISED ANIMATED CHARACTER RECOGNITION IN VIDEO

CROSS-REFERENCE TO RELATED APPLICATIONS

This application claims priority to and benefit from U.S. Provisional Patent Application Ser. No. 62/889,319 titled "SEMI SUPERVISED ANIMATED CHARACTER RECOGNITION IN VIDEO" filed on Aug. 20, 2019, the contents of which are expressly incorporated by reference in its entirety for all purposes herein. This application is related to co-pending U.S. patent application Ser. No. 16/831,105, entitled "NEGATIVE SAMPLING ALGORITHM FOR ENHANCED IMAGE CLASSIFICATION," filed on the same day as this application, the contents of which are expressly incorporated by reference herein.

TECHNICAL FIELD

Aspects of the disclosure are related to the field of machine learning and artificial intelligence, and in particular, to automated recognition and grouping of characters in multi-frame media files, e.g., animated videos, for semi-supervised training of machine learning image classification models.

BACKGROUND

Animation is an extremely large business worldwide and a major offering of many of the largest media companies. However, animated videos typically contain very limited meta-data and, therefore, efficient search and retrieval of specific content is not always possible. For example, a key component in animated media is the animated characters themselves. Indeed, characters in the animated videos must first be indexed, e.g., detected, classified, and annotated, in order to enable efficient search and retrieval of those characters within the animated video.

Various services can leverage artificial intelligence or machine learning for image understanding. However, these services typically rely on extensive manual labeling. For example, character recognition in an animated video currently involves manually drawing bounding boxes around each character and tagging (or labeling) the character contained therein, e.g., with the name of the character. This manual annotation process is repeated for each character of every frame of a multi-frame animated video. Unfortunately, this manual annotation process is tedious and severely limits scalability of these services.

Overall, the examples herein of some prior or related systems and their associated limitations are intended to be illustrative and not exclusive. Upon reading the following, other limitations of existing or prior systems will become apparent to those of skill in the art.

BRIEF SUMMARY

One or more embodiments described herein, among other benefits, solve one or more of the foregoing or other problems in the art by providing systems, methods, and non-transitory computer readable media that can automatically detect and group instances (or occurrences) of characters in a multi-frame animated media file such that each group contains images associated with a single character. The character groups themselves can then be labeled and used to train an image classification model for automatically classifying the animated characters in subsequent multi-frame animated media files.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter. Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 1A:
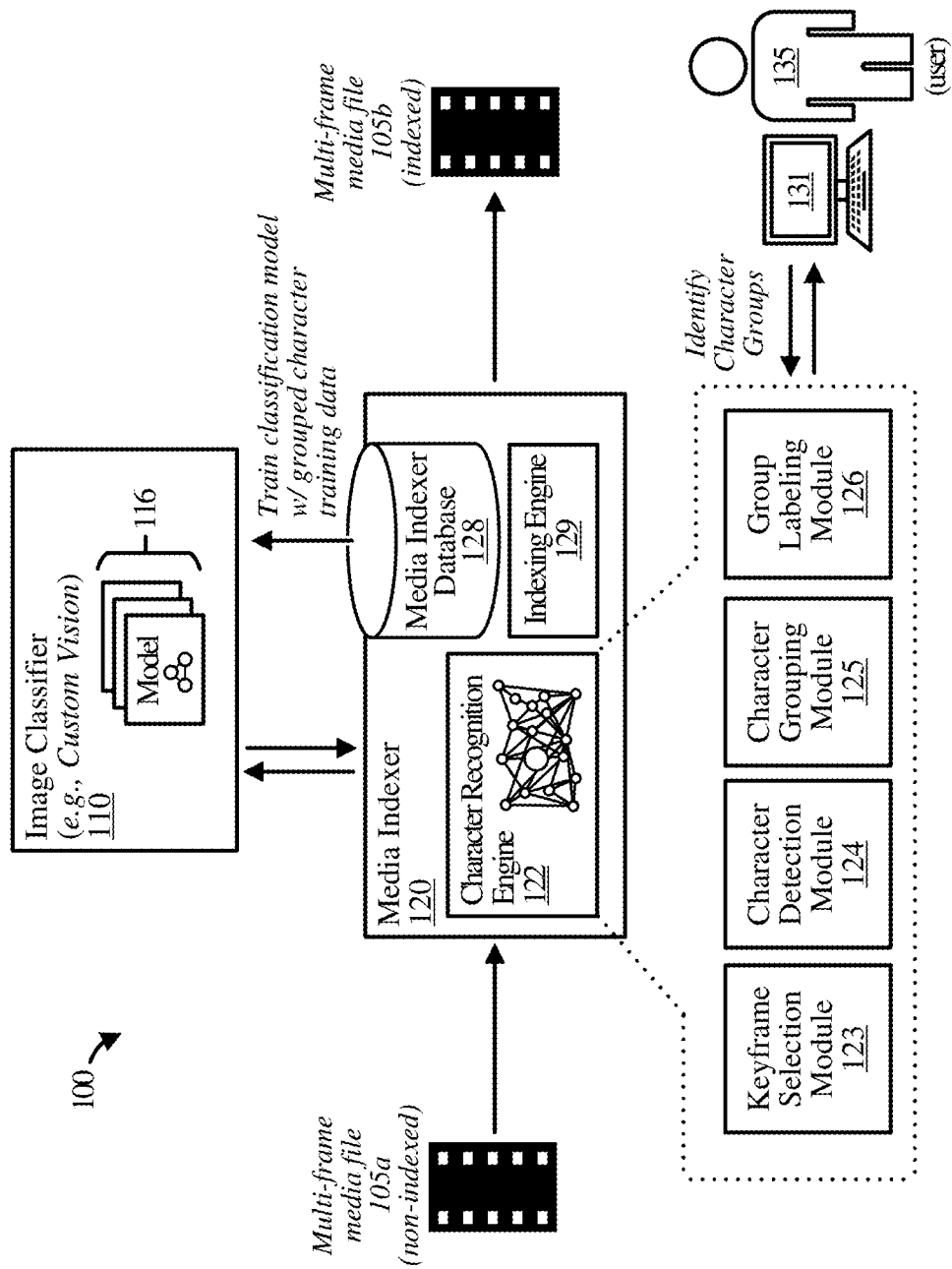
FIG. 1A depicts a block diagram illustrating an example animated character recognition and indexing framework for training an artificial intelligence-based (AI-based) image classification model to automatically classify characters in a multi-frame animated media file for indexing, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include machine-implemented methods, computing devices, or computer readable medium.

Recognizing animated characters in video can be challenging for a number of reasons such as the unorthodox nature of animated characters themselves. Indeed, animated characters can come in many different forms, shapes, sizes, etc. In many cases, content producers, e.g., companies generating or manipulating animated media content, would like to index the characters included in their animated media content. However, as noted above, this is presently a very difficult and non-scalable process that requires manually annotating each character in every frame of a multi-frame animated media file.

The technology described herein is directed to a media indexer including a character recognition engine that can automatically detect and group instances (or occurrences) of characters in a multi-frame animated media file such that each group contains images associated with a single character. The character groups themselves are then labeled and the labeled groups are used to train an image classification model for automatically classifying the animated characters in subsequent multi-frame animated media files.

Various technical effects can be enabled by the techniques discussed herein. Among other benefits, the techniques discussed herein provide a scalable solution for training image classification models with minimal comprise to character detection or character classification accuracy. Additionally, the use of keyframes reduces the amount of data that needs to be processed while keeping the variance of data high. Furthermore, automated character recognition eliminates the need to manually annotate bounding boxes, and automated grouping of the characters yields accurate annotations with substantially reduced manual effort, e.g., semi-supervised training via group labeling as opposed to character-by-character annotation.

As used herein, the term "animated character" refers to an object that exhibits humanlike traits contained or detected in an animated multi-frame animated media file. For example, an "animated character" can be an animate or inanimate anthropomorphic object that exhibits any human form or attribute including, but not limited to, a human trait, emotion, intention, etc.

The embodiments and implementations described herein are primarily discussed with reference to a media indexer including a character recognition engine that can automatically detect and group instances (or occurrences) of characters in a multi-frame animated media file such that each group contains images associated with a single character. It is appreciated that the characters can alternatively or additionally be objects or context regions and the multi-frame animated media files can be any media content including real-time image content. That is, the embodiments and implementations described herein can be directed to any type of customized object or region detection and classification. In any case, the classified groups, e.g., character groups, are then labeled and the labeled groups are used to train an image classification model for automatically classifying the customized objects, regions, animated character, etc., in subsequent multi-frame media files.

Figure 1B:
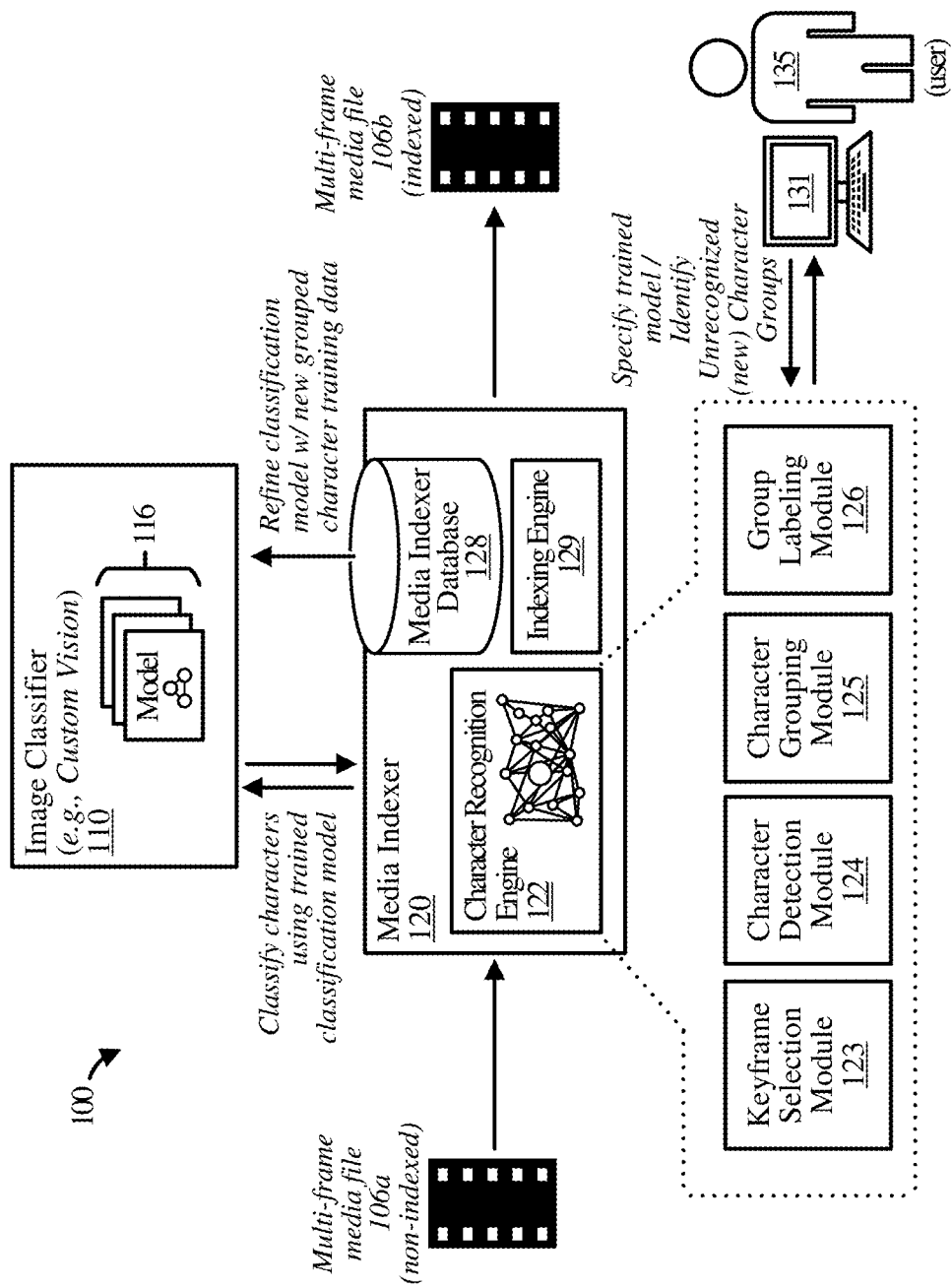
FIG. 1B depicts a block diagram illustrating the example animated character recognition and indexing framework applying (and re-training as necessary) the AI-based image classification model trained in the example of FIG. 1A, according to some implementations.

A general overview and example architecture of an animated character recognition and indexing framework is described for training an AI-based image classification model in relation to FIG. 1A. FIG. 1B then depicts an example whereby the animated character recognition and indexing framework applies (and re-trains or refines as necessary) the trained AI-based image classification model. Thereafter, a more detailed description of the components and processes of the animated character recognition and indexing framework are provided in relation to the subsequent figures.

FIG. 1A depicts a block diagram illustrating an example animated character recognition and indexing framework 100 for training an AI-based image classification model to automatically classify characters in a multi-frame animated media file for indexing, according to some implementations. Indeed, the example animated character recognition and indexing framework 100 includes a media indexer service 120 that can automatically detect and group instances (or occurrences) of characters in the media file such that each group contains images associated with a single character. The character groups are then identified (or recognized) and labeled accordingly. As shown in the example of FIG. 1A, the labeled character groups (or grouped character training data) can then be utilized to train the AI-based image classification model to automatically classify the animated characters in subsequent multi-frame animated media files.

As illustrated in the example of FIG. 1A, the animated character recognition and indexing framework 100 includes an image classifier 110, a media indexer 120 and a user 135 operating a computing system 131 that can provide user input to manually label (or recognize) the character groups. Additional or fewer systems or components are possible.

The image classifier 110 can be any image classifier of image classification service. In some implementations, the image classifier 110 can be embodied by an Azure Custom Vision Service provided by Microsoft. The Custom Vision Service uses a machine learning algorithm to apply labels to images. A developer typically submits groups of labeled images that feature and lack the characteristics in question. The machine learning algorithm uses the submitted data for training and calculates its own accuracy by testing itself on those same images. Once the machine learning algorithm (or model) is trained, the image classifier 110 can test, retrain, and use the model to classify new images.

As illustrated in the example of FIGS. 1A and 1B, the media indexer 120 includes a character recognition engine 122, a media indexer database 128, and an indexing engine 129.

The character recognition engine 122 includes a keyframe selection module 123, a character detection module 124, a character grouping module 125, and a group labeling module 126. The functions represented by the components, modules, managers and/or engines of character recognition engine 122 can be implemented individually or in any combination thereof, partially or wholly, in hardware, software, or a combination of hardware and software. Additionally, although illustrated as discrete components, the operation and functionality of the components, modules, managers and/or engines of the character recognition engine 122 can be, partially or wholly, integrated within other components of the animated character recognition and indexing framework 100.

In operation, a non-indexed (or unstructured) multi-frame animated media file 105a is fed to the media indexer 120 for character recognition and indexing. The media indexer 120 includes a character recognition engine 122, a media indexer database 128, and an indexing engine 129. Additional or fewer systems or components are possible.

The keyframe selection module 123 is configured to select or otherwise identify a small subset of the total frames of a multi-frame animated media file to reduce computational complexity of the character recognition process with minimal or limited effect on accuracy. Indeed, the keyframe selection module 123 is configured to identify and select important or significant frames (e.g., frames with the highest likelihood of observing characters) from the multi-frame animated media file. In some implementations, the keyframes are determined based at least in part, on their individual significance in determining a micro-scene or fraction of a shot. In some implementations, each frame can be assigned a significance value and frames having a significance value greater than a threshold value are selected as keyframes. Alternatively, or additionally, a percentage of the total frames, e.g., top one percent, of the frames with the highest rated significance value can be selected as keyframes.

As discussed herein, the keyframes typically constitute a small fraction, e.g., one percent of the total frames in the multi-frame animated media file, e.g., animated video. However, the performance difference between labeling each of the frames in the multi-frame animated media file versus labeling just the keyframes is nominal for the purposes of detecting each of the characters in the multi-frame animated media file. Thus, the keyframes allow the media indexer 130 to maintain character detection accuracy while simultaneously reducing computation complexity.

The character detection module 124 is configured to process or analyze the keyframes to detect (or propose) instances (or occurrences) of characters in the keyframes of the multi-frame animated media file. Indeed, the character detection module 124 can process the keyframes and provide character region proposals (also referred to as bounding boxes). For example, the character detection module 124 can capture each character region proposal as an image.

As discussed herein, detection of animated characters can be difficult as the characters can take the form of almost any animate (e.g., person, animal, etc.) or inanimate (e.g., robot, car, candle, etc.) object. Accordingly, in some implementations, the character detection module 124 includes an object detection model trained to detect bounding boxes of animated characters in different styles, themes, etc., (e.g., car, persons, robots, etc.).

In some implementations, the character detection module 124 can be trained to detect objects that exhibit humanlike traits. That is, the character detection module 124 is designed to detect any anthropomorphic object within the keyframes. As discussed herein, the term "anthropomorphic object" refers to any animate or inanimate object that exhibits any human form or attributes including, but not limited to, human traits, emotions, intentions, etc.

The character grouping module 125 is configured to compare and group the character region proposals based on similarity of the images such that each group contains images associated with a single character. In some instances, more than one of the resulting character groups can be associated with the same character, e.g., a first group including images of Sponge Bob with a hat and a second group including images of Sponge Bob without a hat.

In some implementations, the character grouping module 125 applies a clustering algorithm using embeddings of the detected character region proposals to determine the character groups. Indeed, the character groups can be determined by embedding the features of the character region proposals (or images) into a feature space to simplify the image comparisons. An example illustrating a method of applying a clustering algorithm including embedding the character region proposals (or images) into the feature space and comparing the embeddings to identify the character groups is shown and discussed in greater detail with reference to FIG. 5.

The group labeling module 126 is configured to label (annotate or classify) the character groups without the use of a classification model. As discussed herein, labeling the character groups is useful for initial training of a classification models as well as for refining trained classification models (as shown and discussed in greater detail with reference to FIG. 1B).

In some implementations, the group labeling module 126 can present each character group to the user 135 as a cluster of images. The character groups can then be classified with input from the user 135. For example, the user 135 can provide an annotation or tag for the group. Alternatively, or additionally, the user 115 can provide canonical images of the characters that are expected to appear in the multi-frame animated media file. In such instances, the canonical characters can be compared to the character groups to identify and label the character groups. In other implementations, the user 115 can provide a movie or series name of the multi-frame animated media file. In such instances, the group labeling module 126 can query a data store, e.g., Satori (Microsoft knowledge graph), for information about the movie and/or series and to extract names of the characters and any available canonical images.

FIG. 1B depicts a block diagram illustrating the example animated character recognition and indexing framework 100 applying (and re-training as necessary) the AI-based image classification model trained in the example of FIG. 1A, according to some implementations. Indeed, the trained AI-based image classification model is trained to automatically recognize and index animated characters in multi-frame animated media file 106a. The multi-frame animated media file 106a is related (e.g., of a same series or with one or more overlapping characters) to the multi-frame animated media file 105a.

As discussed herein, in some implementations, a user can specify a trained AI-based image classification model to use for indexing a multi-frame animated media file. An example illustrating a graphical user interface including various menus for selecting the trained AI-based image classification model is shown and discussed in greater detail with reference to FIG. 6.

In operation, the media indexer 120 can utilize the trained AI-based image classification model to classify character groups and refine (or tune) the trained AI-based image classification model using new grouped character training data, e.g., new characters or existing characters with new or different looks or features. As discussed herein, the media indexer 120 interfaces with the image classifier 110 to utilize, train, and/or refine the AI-based image classification model(s) 116.

As discussed above, the image classifier 110 can be embodied by the Azure Custom Vision Service which can be applied per cluster (or character group). In some implementations, a smoothing operation can be applied to handle cases where a single character is split into two or more different clusters (or character groups), e.g., group including images of Sponge Bob with a hat and group including images of Sponge Bob without a hat. The smoothing operation is operable to consolidate the two or more different clusters (or character groups) and provide grouped character training data to refine the trained AI-based image classification model such that future classifications are classified as the same character.

Figure 2:
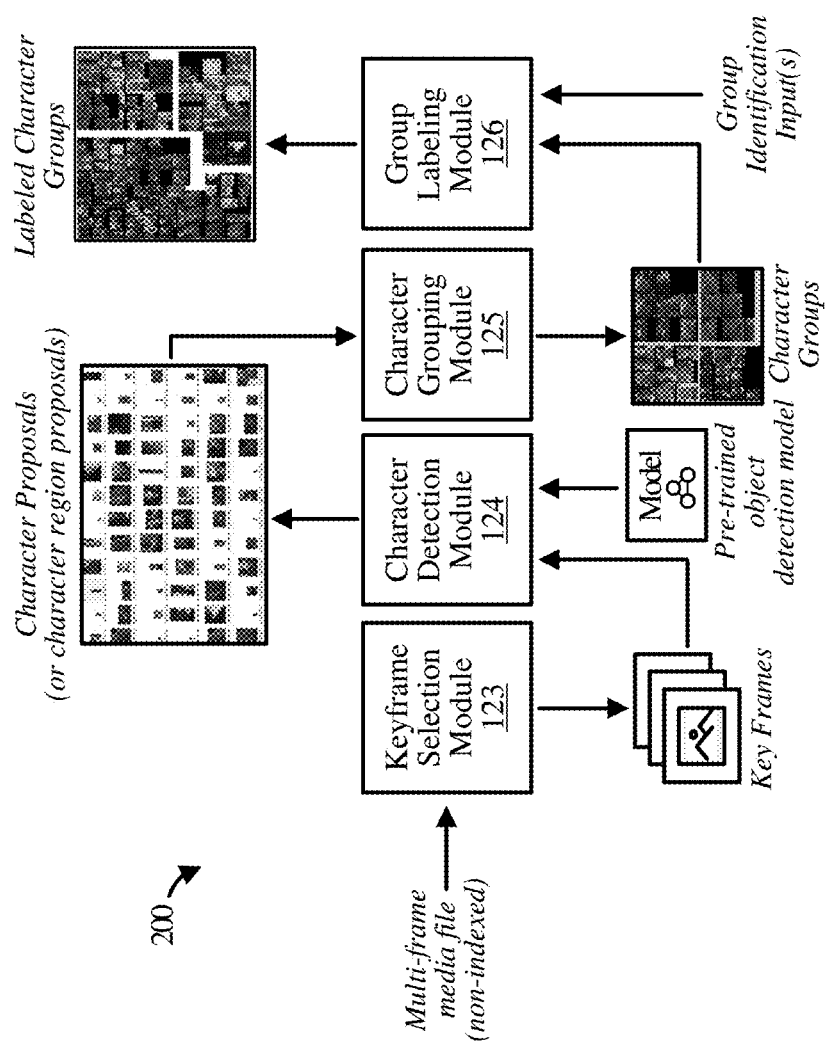
FIG. 2 depicts a data flow diagram that graphically illustrates operations and the flow of data between modules of a media indexer, according to some implementations.

FIG. 2 depicts a data flow diagram that graphically illustrates operations and the flow of data between modules of a media indexer 200, according to some implementations. As shown in the example of FIG. 2, the media indexer 200 includes the keyframe selection module 23, the character detection module 124, the character grouping module 125, and the group labeling module 126 of FIGS. 1A and 1B. Additional or fewer modules, components or engines are possible.

Figure 3:
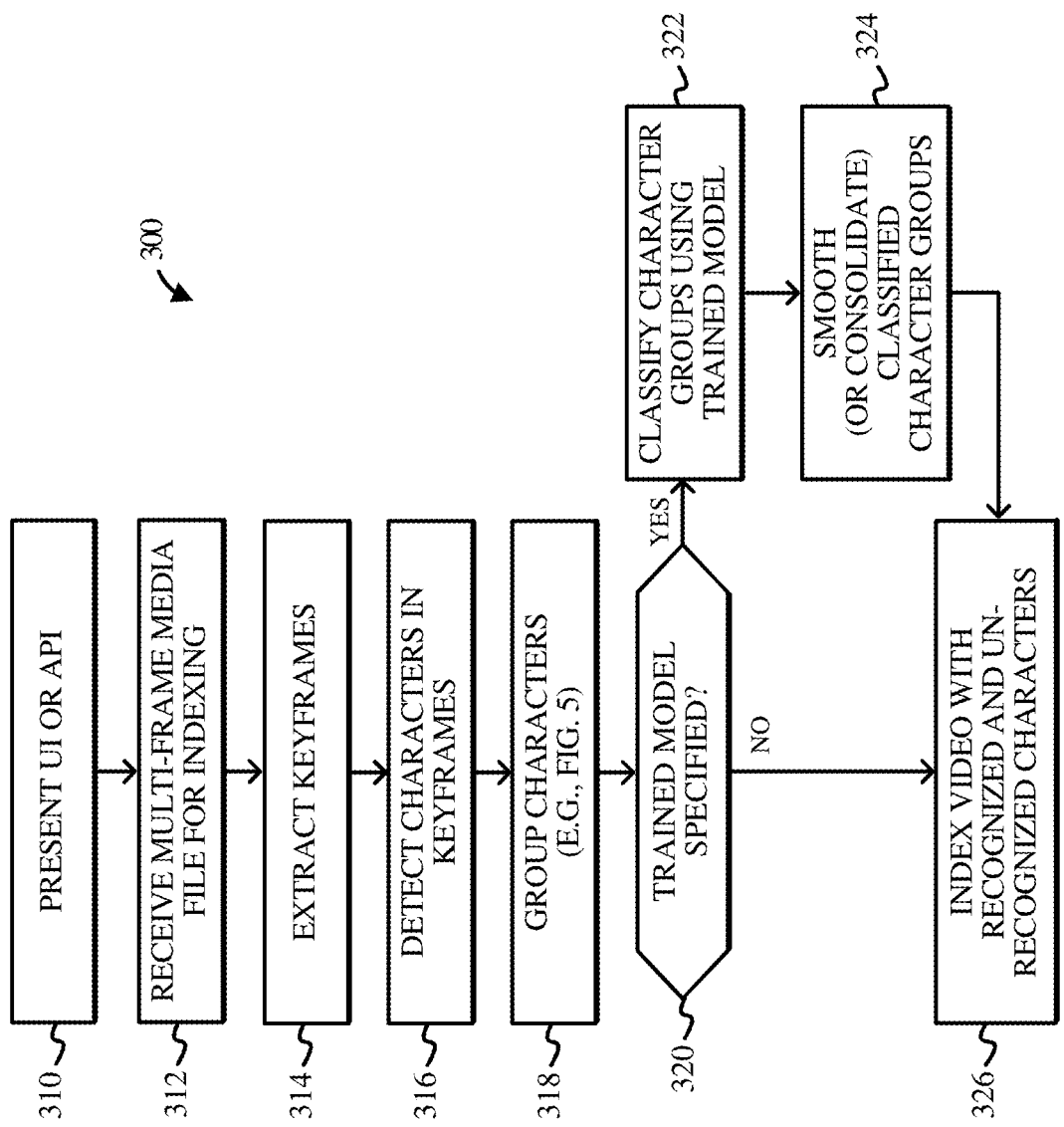
FIG. 3 depicts a flow diagram illustrating an example process for indexing a multi-frame animated media file using the automated character detection and grouping technique discussed herein, according to some implementations.

FIG. 3 depicts a flow diagram illustrating an example process 300 for indexing a multi-frame animated media file, e.g., animated video, using the automated character detection and grouping technique discussed herein, according to some implementations. The example process 300 may be performed in various implementations by a media indexer such as, for example, media indexer 120 of FIGS. 1A and 1B, or one or more processors, modules, engines, or components associated therewith.

To begin, at 310, the media indexer presents a user interface (UI) or application program interface (API). As discussed herein, the user can specify both a multi-frame animated media file to be indexed and an AI-based image classification model with which to index (if trained) or with which to train (if untrained). An example illustrating a graphical user interface including various menus for selecting the trained AI-based image classification model is shown and discussed in greater detail with reference to FIG. 6.

At 312, the media indexer receives a multi-frame animated media file, e.g., animated video, for indexing. At 314, the media indexer extracts or identifies keyframes. At 316, the media indexer detects characters in the keyframes. At 318, the media indexer groups the characters that are automatically detected in a multi-frame animated media file. An example illustrating character grouping is shown and discussed in greater detail with reference to FIG. 5. At 320, the media indexer determines if a trained classification model is specified. If so, at 322, the media indexer classifies the character groups using the trained classification model and, at 324, smooths (or consolidates) the classified character groups.

Figure 8:
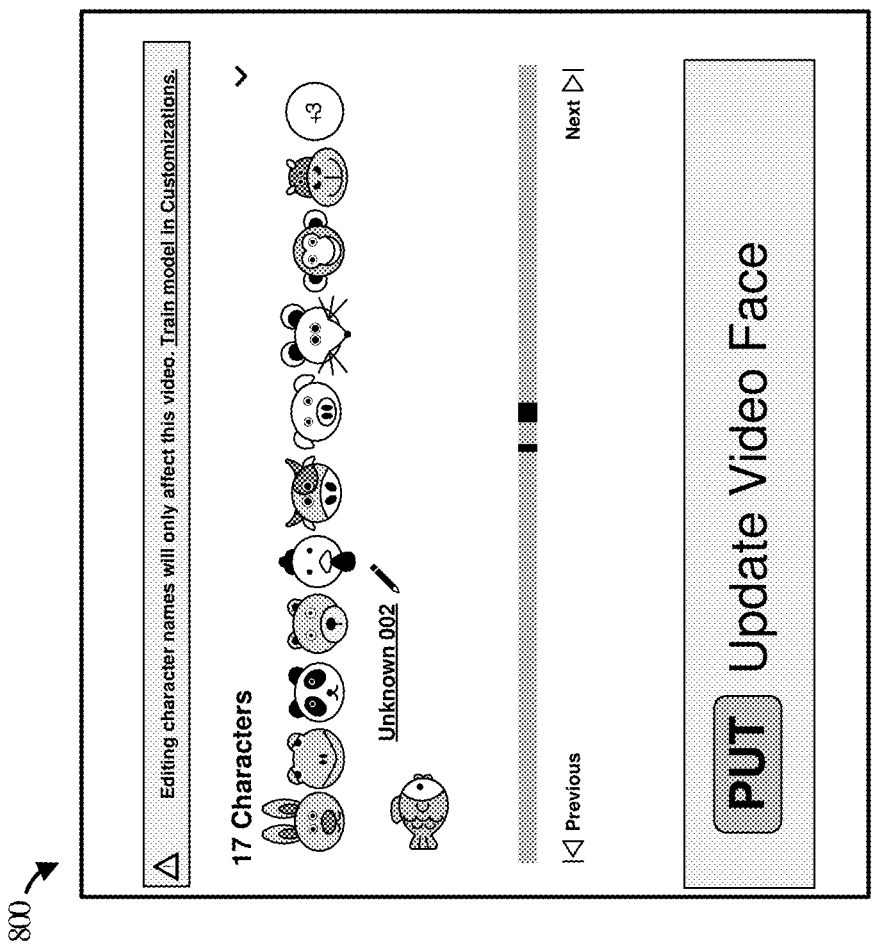
FIG. 8 depicts a graphical user interface illustrating an example video that has been indexed using the media indexer, according to some implementations.

Lastly, at 326, the multi-frame animated media file, e.g., animated video, is indexed with recognized (classified) and unrecognized (unknown) characters. An example graphical user interface illustrating an indexed multi-frame animated media file with both recognized and unrecognized characters is shown in the example of FIG. 8. As discussed herein, the user can specify or label the unrecognized character groups to refine the AI-based image classification model.

Figure 4:
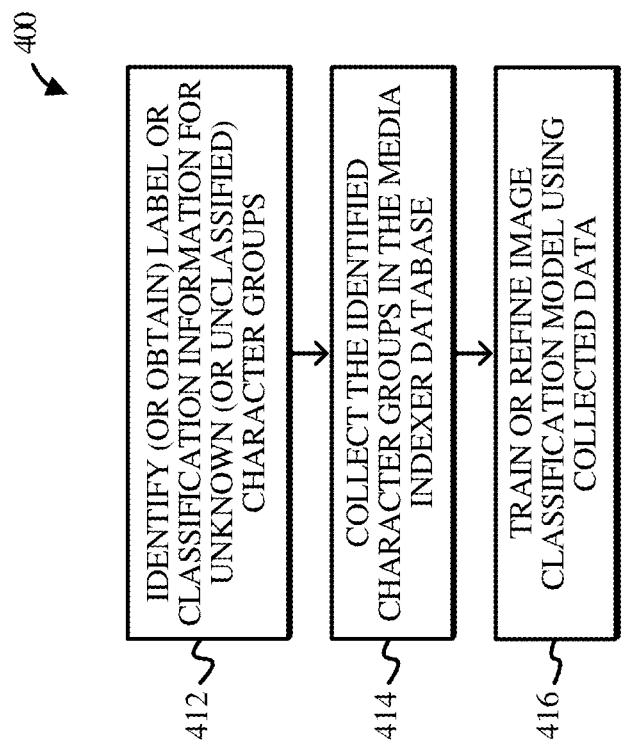
FIG. 4 depicts a flow diagram illustrating an example process for training or refining an AI-based image classification model using grouped character training data, according to some implementations.

FIG. 4 depicts a flow diagram illustrating an example process 400 for training or refining an AI-based image classification model using grouped character training data, according to some implementations. The example process 400 may be performed in various implementations by a media indexer such as, for example, media indexer 120 of FIGS. 1A and 1B, or one or more processors, modules, engines, or components associated therewith.

To begin, at 412, the media indexer identifies (or otherwise obtains) label or classification information for unknown (or unclassified) animated character groups. As discussed herein, the media indexer can identify label information, e.g., the name of the single animated character associated with each animated character group and classify (or annotate) the animated character groups with the identified label information resulting in at least one annotated animated character group At 414, the media indexer collects the identified (or annotated) animated character groups in a media indexer database. Lastly, at 416, the media indexer trains or refines an image classification model by feeding the annotated animated character groups to an image classifier to train an image classification model.

Figure 5:
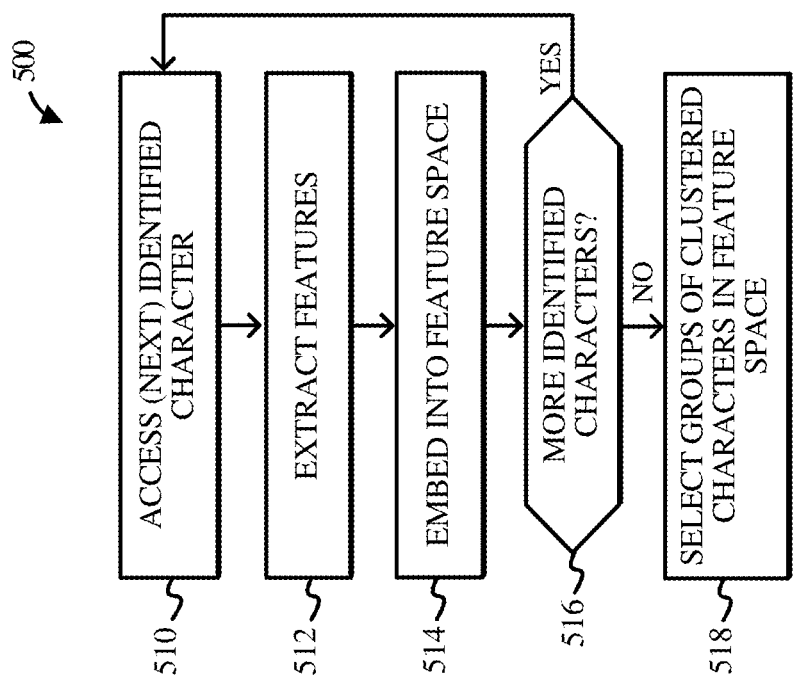
FIG. 5 depicts a flow diagram illustrating an example process for grouping (or clustering) characters that are automatically detected in a multi-frame animated media file, according to some implementations.

FIG. 5 depicts a flow diagram illustrating an example process 500 for grouping (or clustering) characters that are automatically detected in a multi-frame animated media file, according to some implementations. The example process 500 may be performed in various implementations by a media indexer such as, for example, media indexer 120 of FIGS. 1A and 1B, or one or more processors, modules, engines, or components associated therewith.

To begin, at 510, the media indexer accesses a next identified character. As discussed herein, each character region proposal comprises a bounding box or subset of a keyframe containing a proposed animated character. At 512, the media indexer extract features of the next identified character contained in the character region proposal and, at 514, embeds the features in a feature space.

At decision 516, the media indexer determines if more character region proposals have been identified and, if so, returns to step 510. As discussed herein, multiple keyframes from a multi-frame animated media file are first identified. Each of keyframes can include one or more character region proposals. Once each character region proposal is travers, at 518, the media indexer selects the groups of clusters character in the feature space. For example, the media indexer can determine a similarity between the character region proposals by comparing the embedded features within the feature space and apply a clustering algorithm to identify the animated character groups based on the determined similarity.

Figure 6:
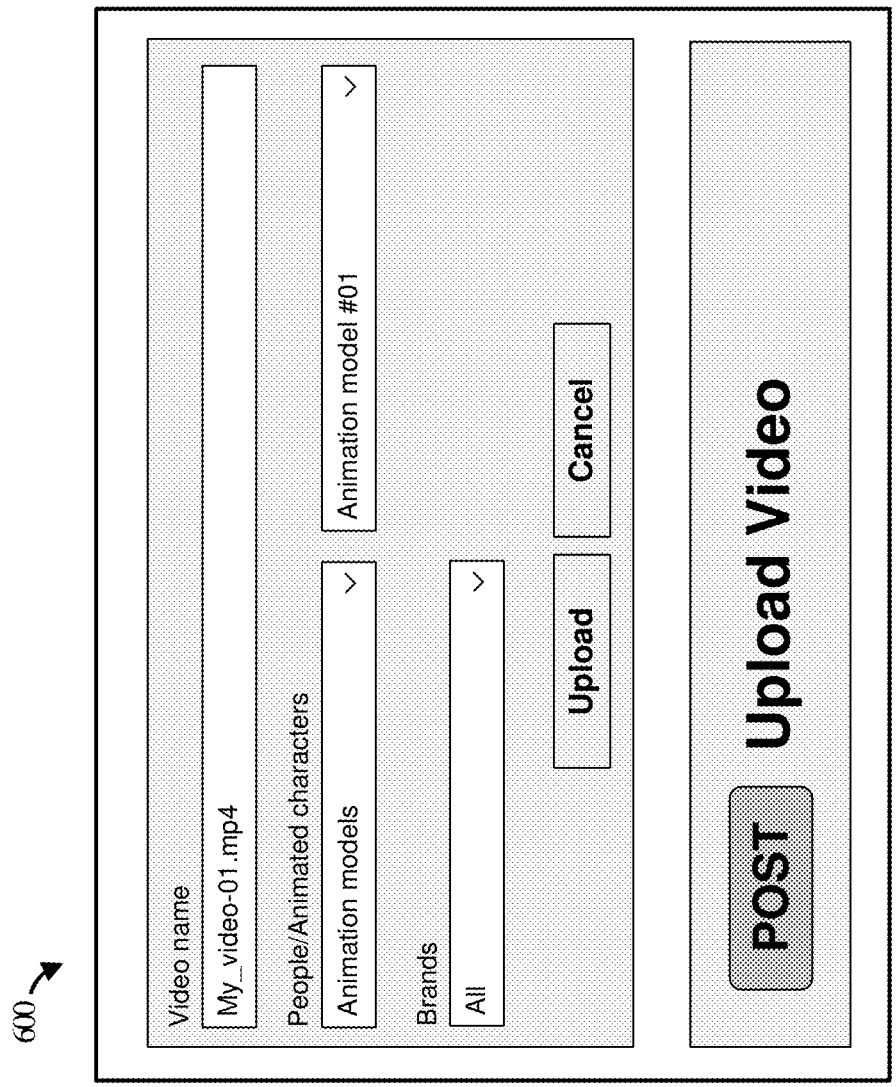
FIG. 6 depicts a graphical user interface including various menus for selecting various options for uploading a video file, according to some implementations.
Figure 7:
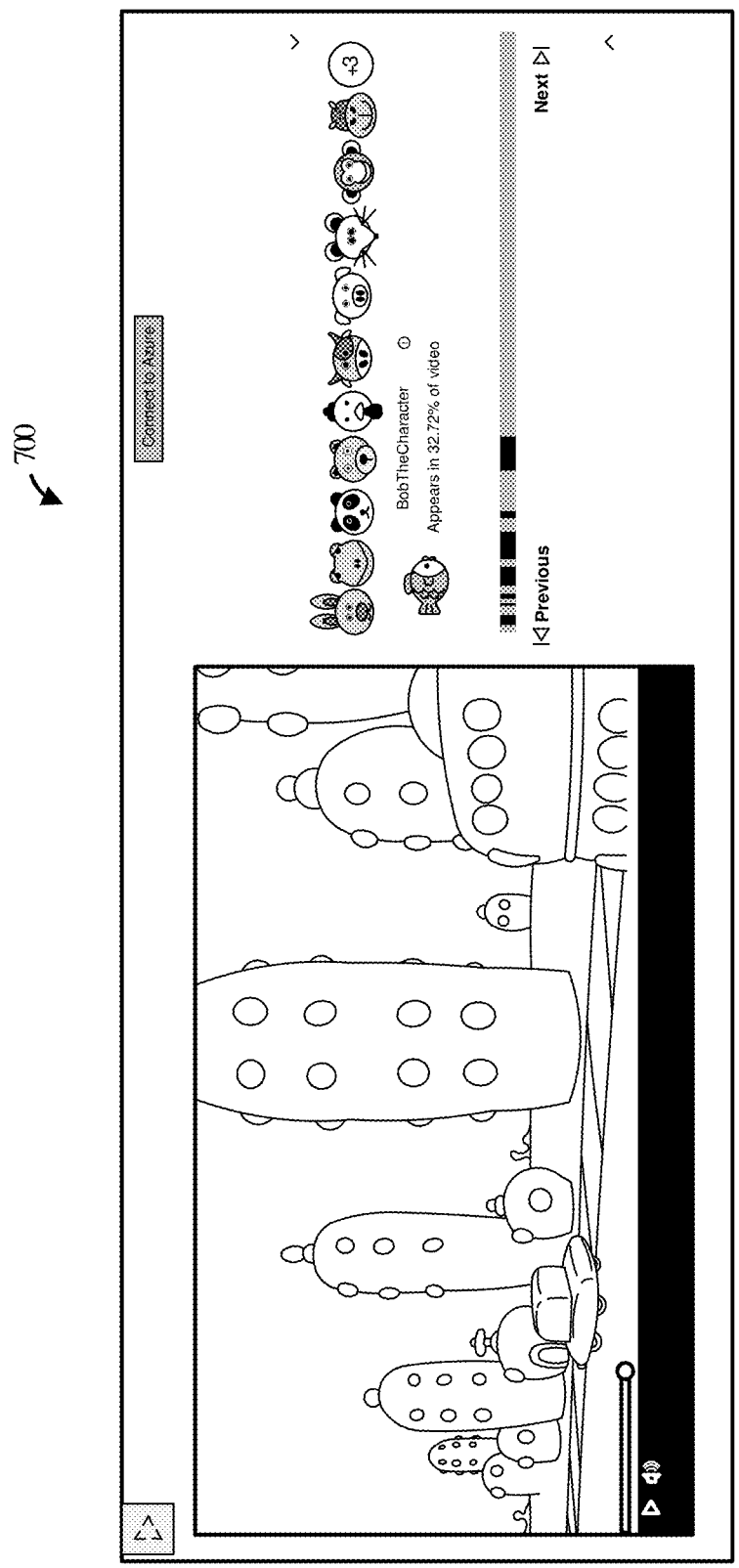
FIG. 7 depicts a graphical user interface illustrating an example video that has been indexed using a media indexer, according to some implementations.

FIG. 6-8 depict various graphical user interfaces that can be presented to a user. Referring first to the example of FIG. 6, FIG. 6 depicts a graphical user interface including various menus for selecting various options for uploading a video file, according to some implementations. More specifically, FIG. 6 depicts a graphical user interface including various menus for selecting various options for uploading a video file and (optionally) selecting a trained AI-based image classification model with which to index the video file (or alternatively to train).

Referring next to the example of FIG. 7 which depicts a graphical user interface illustrating an example video that has been indexed using the media indexer discussed herein. Indeed, the example of FIG. 7 illustrates instances of various different characters that have been identified, classified and indexed in an example video. Similarly, FIG. 8 depicts a graphical user interface illustrating an example video that has been indexed using the media indexer discussed herein.

Figure 9:
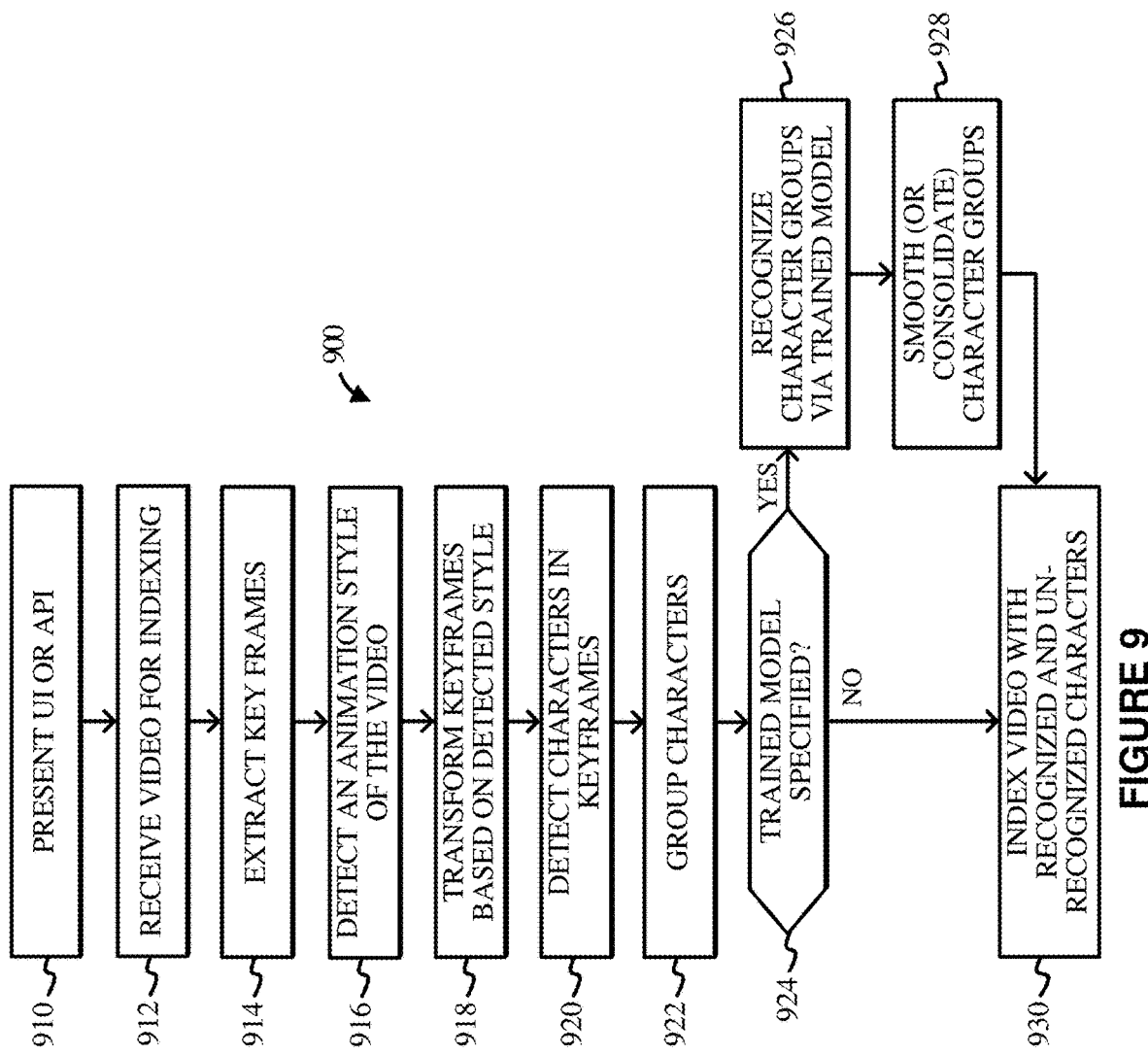
FIG. 9 depicts a flow diagram illustrating an example process for indexing a multi-frame animated media file using the automated character detection and grouping technique discussed herein, according to some implementations.

FIG. 9 depicts a flow diagram illustrating an example process 900 for indexing a multi-frame animated media file, e.g., animated video, using the automated character detection and grouping technique discussed herein, according to some implementations. The example process 900 may be performed in various implementations by a media indexer such as, for example, media indexer 120 of FIGS. 1A and 1B, or one or more processors, modules, engines, or components associated therewith.

The example process 900 is similar to example process 300 except that example process 900 includes steps for style adaptation. For example, an AI-based image classification model can be trained using a first type (or style) of animation, e.g., computer generated graphics (CGI) and subsequently applied to an input including as second type (or style) of animation, e.g., hand drawn animations, without retraining model. Among other potential options, the keyframes can be adjusted or transformed (as shown in the example of FIG. 9) or the extracted features can be transformed prior to embedding into the feature space (as shown in the example of FIG. 10).

Referring again to FIG. 9, in some implementations, an additional network for style adaptation can be added to the detector, e.g., character detection module 124, for online adaptation of unseen (or unknown) animation styles. The additional network can be trained offline in a variety of manners. For example, training data can be based on a labeled dataset that is used for training the detector and dataset of unseen movies (e.g. trailers). The style adaption network can learn to propagate local feature statistics from the dataset used for training to the unseen data. The training can be based on minimax optimization that maximizes the character detector confidence on the characters detected in the unseen images, while minimizing the distance of the deep learned embeddings of the images before and after style transfer (thus maintaining similar semantic information). The deep learned embeddings that can be used are the same that are used for featurizing and grouping.

Figure 10:
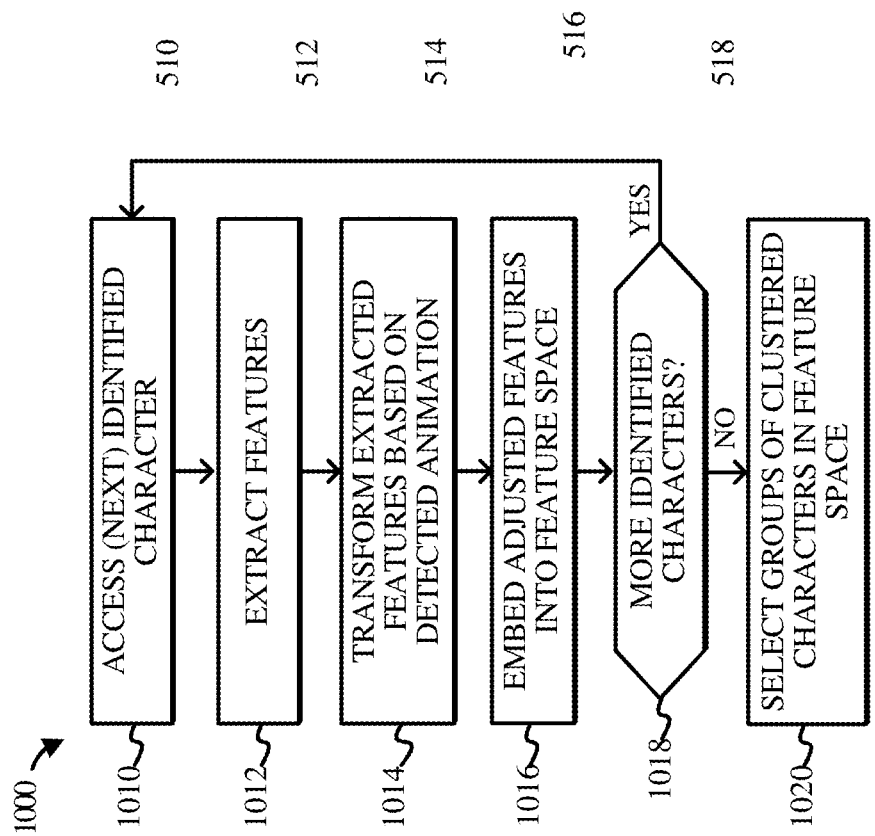
FIG. 10 depicts a flow diagram illustrating another example process for grouping (or clustering) characters that are automatically detected in a multi-frame animated media file, according to some implementations.

FIG. 10 depicts a flow diagram illustrating another example process 1000 for grouping (or clustering) characters that are automatically detected in a multi-frame animated media file, according to some implementations. The example process 1000 may be performed in various implementations by a media indexer such as, for example, media indexer 120 of FIGS. 1A and 1B, or one or more processors, modules, engines, or components associated therewith.

The example process 1000 is similar to example process 500 of FIG. 5 except that example process 1000 includes steps for style adaptation. Specifically, the example process 1000 can adapt or transform features as opposed to entire keyframes (as discussed in the example of FIG. 9).

Figure 11:
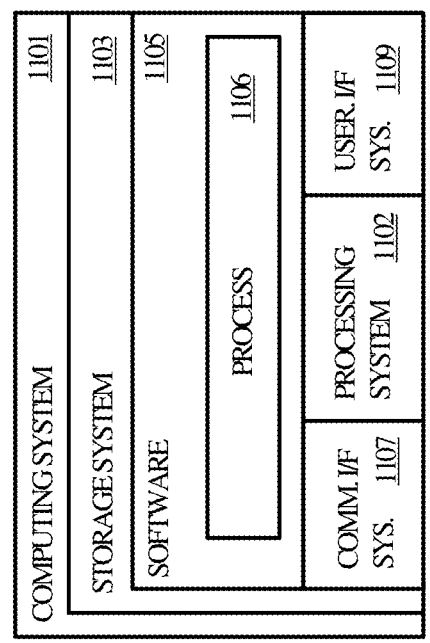
FIG. 11 depicts a block diagram illustrating an example computing system suitable for implementing the technology disclosed herein, including any of the applications, architectures, elements, processes, and operational scenarios and sequences illustrated in the Figures and discussed below in the Technical Disclosure.

FIG. 11 illustrates computing system 1101 that is representative of any system or collection of systems in which the various processes, programs, services, and scenarios disclosed herein may be implemented. Examples of computing system 1101 include, but are not limited to, server computers, cloud computing platforms, and data center equipment, as well as any other type of physical or virtual server machine, container, and any variation or combination thereof. Other examples include desktop computers, laptop computers, table computers, Internet of Things (IoT) devices, wearable devices, and any other physical or virtual combination or variation thereof.

Computing system 1101 may be implemented as a single apparatus, system, or device or may be implemented in a distributed manner as multiple apparatuses, systems, or devices. Computing system 1101 includes, but is not limited to, processing system 1102, storage system 1103, software 1105, communication interface system 1107, and user interface system 1109 (optional). Processing system 1102 is operatively coupled with storage system 1103, communication interface system 1107, and user interface system 1109.

Processing system 1102 loads and executes software 1105 from storage system 1103. Software 1105 includes and implements process 1106, which is representative of the processes discussed with respect to the preceding Figures. When executed by processing system 1102 to provide packet rerouting, software 1105 directs processing system 1102 to operate as described herein for at least the various processes, operational scenarios, and sequences discussed in the foregoing implementations. Computing system 1101 may optionally include additional devices, features, or functionality not discussed for purposes of brevity.

Continuing with the example of FIG. 11, processing system 1102 may comprise a micro-processor and other circuitry that retrieves and executes software 1105 from storage system 1103. Processing system 1102 may be implemented within a single processing device but may also be distributed across multiple processing devices or sub-systems that cooperate in executing program instructions. Examples of processing system 1102 include general purpose central processing units, graphical processing units, application specific processors, and logic devices, as well as any other type of processing device, combinations, or variations thereof.

Storage system 1103 may comprise any computer readable storage media readable by processing system 1102 and capable of storing software 1105. Storage system 1103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device but may also be implemented across multiple storage devices or sub-systems co-located or distributed relative to each other. Storage system 1103 may comprise additional elements, such as a controller, capable of communicating with processing system 1102 or possibly other systems.

Software 1105 (including learning process 1106) may be implemented in program instructions and among other functions may, when executed by processing system 1102, direct processing system 1102 to operate as described with respect to the various operational scenarios, sequences, and processes illustrated herein. For example, software 1105 may include program instructions for implementing a reinforcement learning process to learn an optimum scheduling policy as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1105 may include additional processes, programs, or components, such as operating system software, virtualization software, or other application software. Software 1105 may also comprise firmware or some other form of machine-readable processing instructions executable by processing system 1102.

In general, software 1105 may, when loaded into processing system 1102 and executed, transform a suitable apparatus, system, or device (of which computing system 1101 is representative) overall from a general-purpose computing system into a special-purpose computing system customized to provide motion learning. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

Communication between computing system 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

Certain inventive aspects may be appreciated from the foregoing disclosure, of which the following are various examples.

Example 1: One or more non-transitory computer readable storage media having a media indexer service stored thereon are disclosed. The media indexer comprises a character recognition engine including program instructions that, when executed by one or more processing systems of a computing apparatus, direct the computing apparatus to: identify keyframes of a multi-frame animated media file; detect character region proposals within the keyframes, wherein each character region proposal comprises a bounding box or subset of a keyframe containing a proposed animated character; determine a similarity between the character region proposals by embedding features of the character region proposals into a feature space; and automatically group the character region proposals into animated character groups based on the similarity, wherein each animated character group is associated with a single animated character of the multi-frame animated media file.

Example 2: The one or more computer readable storage media of Example 1, wherein to detect the character region proposals within the keyframes, the character recognition engine further includes program instructions that, when executed by the one or more processing systems of the computing apparatus, further direct the computing apparatus to: access a pre-trained object detection model; and process the keyframes using the pre-trained object detection model to identify the character region proposals.

Example 3: The one or more computer readable storage media of Example 1, wherein to determine the similarity between the character region proposals, the character recognition engine includes program instructions that, when executed by the one or more processing systems of the computing apparatus, direct the computing apparatus to: for each of the character region proposals, extract features of the character region proposal; embed the features of the character region proposal into a feature space; and determine the similarity between the character region proposals by comparing the embedded features within the feature space.

Example 4: The one or more computer readable storage media of Example 3, wherein to automatically group the character region proposals into the animated character groups based on the similarity, the character recognition engine includes program instructions that, when executed by the one or more processing systems of the computing apparatus, direct the computing apparatus to: apply a clustering algorithm to identify the animated character groups based on the determined similarity.

Example 5: The one or more computer readable storage media of Example 1, wherein the character recognition engine includes program instructions that, when executed by the one or more processing systems of the computing apparatus, further direct the computing apparatus to: identify label information associated with at least one of the animated character groups; and classify the at least one of the animated character groups with the identified label information resulting in at least one annotated animated character group.

Example 6: The one or more computer readable storage media of Example 5, wherein to identify the label information associated with the animated character groups, the character recognition engine further includes program instructions that, when executed by one or more processing systems of a computing apparatus, direct the computing apparatus to: present the at least one of the animated character groups to a user in a user interface; and receive, via the user interface, the label information associated with at least one of the animated character groups.

Example 7: The one or more computer readable storage media of Example 1, the media indexer further comprising: an indexing engine including program instructions that, when executed by one or more processing systems of a computing apparatus, direct the computing apparatus to: collect annotated animated character groups; store the annotated animated character groups in a media indexer database; and feed the annotated animated character groups to an image classifier to train an image classification model.

Example 8: The one or more computer readable storage media of Example 1, the media indexer further comprising: an indexing engine including program instructions that, when executed by one or more processing systems of a computing apparatus, direct the computing apparatus to: determine that a trained image classification model has been specified; automatically recognize, using the trained image classification model, label information associated with at least one of the animated character groups; and classify the at least one of the animated character groups with the recognized label information resulting in the at least one of the annotated animated character groups.

Example 9: The one or more computer readable storage media of Example 8, wherein the indexing engine includes program instructions that, when executed by the one or more processing systems of the computing apparatus, further direct the computing apparatus to: index the multi-frame animated media file using the at least one of the annotated animated character groups.

Example 10: The one or more computer readable storage media of Example 8, wherein the indexing engine includes program instructions that, when executed by the one or more processing systems of the computing apparatus, further direct the computing apparatus to: perform a smoothing operation to consolidate two or more of the annotated animated character groups into a single annotated animated character group.

Example 11: The one or more computer readable storage media of Example 1, wherein the character recognition engine includes program instructions that, when executed by the one or more processing systems of the computing apparatus, further direct the computing apparatus to: automatically detect an animation style of the multi-frame animated media file; and prior to detecting the character region proposals within the keyframes, transforming the keyframes based on the detected animation style.

Example 12: A computer-implemented method for training an image classification model to automatically classifying animated characters in a multi-frame animated media file, the method comprising: detecting character region proposals within keyframes of a multi-frame animated media file, wherein each character region proposal comprises a bounding box or subset of a keyframe containing a proposed animated character; embedding features of the character region proposals into a feature space to determine a similarity between the character region proposals; automatically grouping the character region proposals into animated character groups based on the similarity, wherein each character group is associated with a single animated character of the multi-frame animated media file; classifying at least one of the animated character groups with label information resulting in at least one annotated animated character group; and training an image classification model to automatically classify animated characters in subsequent multi-frame animated media files by feeding the at least one annotated animated character group to an image classifier.

Example 13: The computer-implemented method of Example 12, the method further comprising: indexing the multi-frame animated media file using the at least one of the annotated animated character groups.

Example 14: The computer-implemented method of Example 12, wherein determining the similarity between the character region proposals includes, for each of the character region proposals: extracting features of the character region proposal; embedding the features of the character region proposal into a feature space; and determining the similarity between the character region proposals by comparing the embedded features within the feature space.

Example 15: The computer-implemented method of Example 12, wherein automatically grouping the character region proposals into the animated character groups based on the similarity includes applying a clustering algorithm to identify the animated character groups based on the determined similarity.

Example 16: The computer-implemented method of Example 12, further comprising: identifying the label information associated with at least one of the animated character groups.

Example 17: The computer-implemented method of Example 16, wherein identifying the label information associated with the at least one of the animated character groups includes: presenting the at least one of the animated character groups to a user in a graphical user interface; and receiving, via the graphical user interface, the label information associated with at least one of the animated character groups.

Example 18: A system comprising: one or more computer readable storage media; and a character recognition engine stored on the one or more computer readable storage media, the character recognition engine comprising: a keyframe selection module configured to identify keyframes of a multi-frame animated media file; a character detection module configured to: detect character region proposals within the keyframes using a pre-trained object detection model, wherein each character region proposal comprises a bounding box containing a proposed animated character found within the a keyframe; and a character grouping module configured to: embed features of the character region proposals into a feature space; compare the embedded features within the feature space to determine a similarity between the character region proposals; and group the character region proposals into animated character groups based on the similarity, wherein each character group is associated with a single animated character of the multi-frame animated media file.

Example 19: The media indexer of Example 18, the character recognition engine further comprising: a group labeling module configured to: identify label information associated with at least one of the animated character groups; and classify the at least one of the animated character groups with the identified label information resulting in at least one annotated animated character group.

Example 20: The media indexer of Example 18, the system further comprising: an indexing engine configured to: collect annotated animated character groups; store the annotated animated character groups in a media indexer database; and feed the annotated animated character groups to an image classifier to train an image classification model.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The phrases "in some embodiments," "according to some embodiments," "in the embodiment shown," "in other embodiments," "in some implementations," "according to some implementations," "in the implementation shown," "in other implementations," and the like generally mean the particular feature, structure, or characteristic following the phrase is included in at least one embodiment or implementation of the present technology and may be included in more than one embodiment or implementation. In addition, such phrases do not necessarily refer to the same or different embodiments or implementations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. One or more non-transitory computer readable storage media having a media indexer service stored thereon, the media indexer service comprising:
a character recognition engine including program instructions that, when executed by one or more processing systems of a computing apparatus, direct the computing apparatus to:
identify keyframes of a multi-frame animated media file;
detect character region proposals within the keyframes, wherein each character region proposal comprises a bounding box or subset of a keyframe containing a proposed animated character;
determine a similarity between the character region proposals by embedding features of the character region proposals into a feature space; and
automatically group the character region proposals into animated character groups based on the similarity, wherein each animated character group is associated with a single animated character of the multi-frame animated media file.

2. The one or more non-transitory computer readable storage media of claim 1, wherein to detect the character region proposals within the keyframes, the program instructions, when executed by the one or more processing systems of the computing apparatus, further direct the computing apparatus to:
access a pre-trained object detection model; and
process the keyframes using the pre-trained object detection model to identify the character region proposals.

3. The one or more non-transitory computer readable storage media of claim 1, wherein to determine the similarity between the character region proposals, the program instructions, when executed by the one or more processing systems of the computing apparatus, direct the computing apparatus to:
for each character region proposal of the character region proposals,
extract features of the character region proposal;
embed the features of the character region proposal into a feature space; and
determine the similarity between the character region proposals by comparing the embedded features within the feature space.

4. The one or more non-transitory computer readable storage media of claim 3, wherein to automatically group the character region proposals into the animated character groups based on the similarity, the program instructions, when executed by the one or more processing systems of the computing apparatus, direct the computing apparatus to:
apply a clustering algorithm to identify the animated character groups based on the determined similarity.

5. The one or more non-transitory computer readable storage media of claim 1, wherein the program instructions, when executed by the one or more processing systems of the computing apparatus, further direct the computing apparatus to:
identify label information associated with at least one of the animated character groups; and
classify the at least one of the animated character groups with the identified label information resulting in at least one annotated animated character group.

6. The one or more non-transitory computer readable storage media of claim 5, wherein to identify the label information associated with the animated character groups, the program instructions, when executed by one or more processing systems of a computing apparatus, direct the computing apparatus to:
  present the at least one of the animated character groups to a user in a user interface; and
  receive, via the user interface, the label information associated with at least one of the animated character groups.

7. The one or more non-transitory computer readable storage media of claim 1, wherein the media indexer service further comprises:
  an indexing engine including program instructions that, when executed by one or more processing systems of a computing apparatus, direct the computing apparatus to:
    collect annotated animated character groups;
    store the annotated animated character groups in a media indexer database; and
    feed the annotated animated character groups to an image classifier to train an image classification model.

8. The one or more non-transitory computer readable storage media of claim 1, wherein the media indexer service further comprises:
  an indexing engine including additional instructions that, when executed by one or more processing systems of a computing apparatus, direct the computing apparatus to:
    determine that a trained image classification model has been specified;
    automatically recognize, using the trained image classification model, label information associated with at least one of the animated character groups; and
    classify the at least one of the animated character groups with the recognized label information resulting in at least one annotated animated character group.

9. The one or more non-transitory computer readable storage media of claim 8, wherein the additional instructions, when executed by the one or more processing systems of the computing apparatus, further direct the computing apparatus to:
  index the multi-frame animated media file using the at least one annotated animated character group.

10. The one or more non-transitory computer readable storage media of claim 8, wherein additional instructions, when executed by the one or more processing systems of the computing apparatus, further direct the computing apparatus to:
  perform a smoothing operation to consolidate two or more of the annotated animated character groups into a single annotated animated character group.

11. The one or more non-transitory computer readable storage media of claim 1, wherein the program instructions, when executed by the one or more processing systems of the computing apparatus, further direct the computing apparatus to:
  automatically detect an animation style of the multi-frame animated media file; and
  prior to detecting the character region proposals within the keyframes, transforming the keyframes based on the detected animation style.

12. A computer-implemented method for training an image classification model to automatically classifying animated characters in a multi-frame animated media file, the method comprising:
  detecting character region proposals within keyframes of a multi-frame animated media file, wherein each character region proposal comprises a bounding box or subset of a keyframe containing a proposed animated character;
  embedding features of the character region proposals into a feature space to determine a similarity between the character region proposals;
  automatically grouping the character region proposals into animated character groups based on the similarity, wherein each character group is associated with a single animated character of the multi-frame animated media file;
  classifying at least one of the animated character groups with label information resulting in at least one annotated animated character group; and
  training an image classification model to automatically classify animated characters in subsequent multi-frame animated media files by feeding the at least one annotated animated character group to an image classifier.

13. The computer-implemented method of claim 12, the method further comprising:
  indexing the multi-frame animated media file using the at least one of the annotated animated character groups.

14. The computer-implemented method of claim 12, wherein determining the similarity between the character region proposals includes, for each character region proposal of the character region proposals:
  extracting features of the character region proposal;
  embedding the features of the character region proposal into a feature space; and
  determining the similarity between the character region proposals by comparing the embedded features within the feature space.

15. The computer-implemented method of claim 12, wherein automatically grouping the character region proposals into the animated character groups based on the similarity includes applying a clustering algorithm to identify the animated character groups based on the determined similarity.

16. The computer-implemented method of claim 12, further comprising:
  identifying the label information associated with at least one of the animated character groups.

17. The computer-implemented method of claim 16, wherein identifying the label information associated with the at least one of the animated character groups includes:
  presenting the at least one of the animated character groups to a user in a graphical user interface; and
  receiving, via the graphical user interface, the label information associated with at least one of the animated character groups.

18. A system comprising:
  one or more computer readable storage media; and
  a character recognition engine stored on the one or more computer readable storage media, the character recognition engine comprising:
    a keyframe selection module configured to identify keyframes of a multi-frame animated media file;
    a character detection module configured to:
      detect character region proposals within the keyframes using a pre-trained object detection model, wherein each character region proposal comprises a bounding box containing a proposed animated character found within the a keyframe; and
    a character grouping module configured to:

embed features of the character region proposals into a feature space;

compare the embedded features within the feature space to determine a similarity between the character region proposals; and group the character region proposals into animated character groups based on the similarity, wherein each character group is associated with a single animated character of the multi-frame animated media file.

19. The system of claim 18, further comprising:

a group labeling module configured to:

identify label information associated with at least one of the animated character groups; and classify the at least one of the animated character groups with the identified label information resulting in at least one annotated animated character group.

20. The system of claim 18, further comprising:

an indexing engine configured to:

collect annotated animated character groups;

store the annotated animated character groups in a media indexer database; and feed the annotated animated character groups to an image classifier to train an image classification model.

* * * * *